United States Patent Office 3,358,424
Patented Dec. 19, 1967

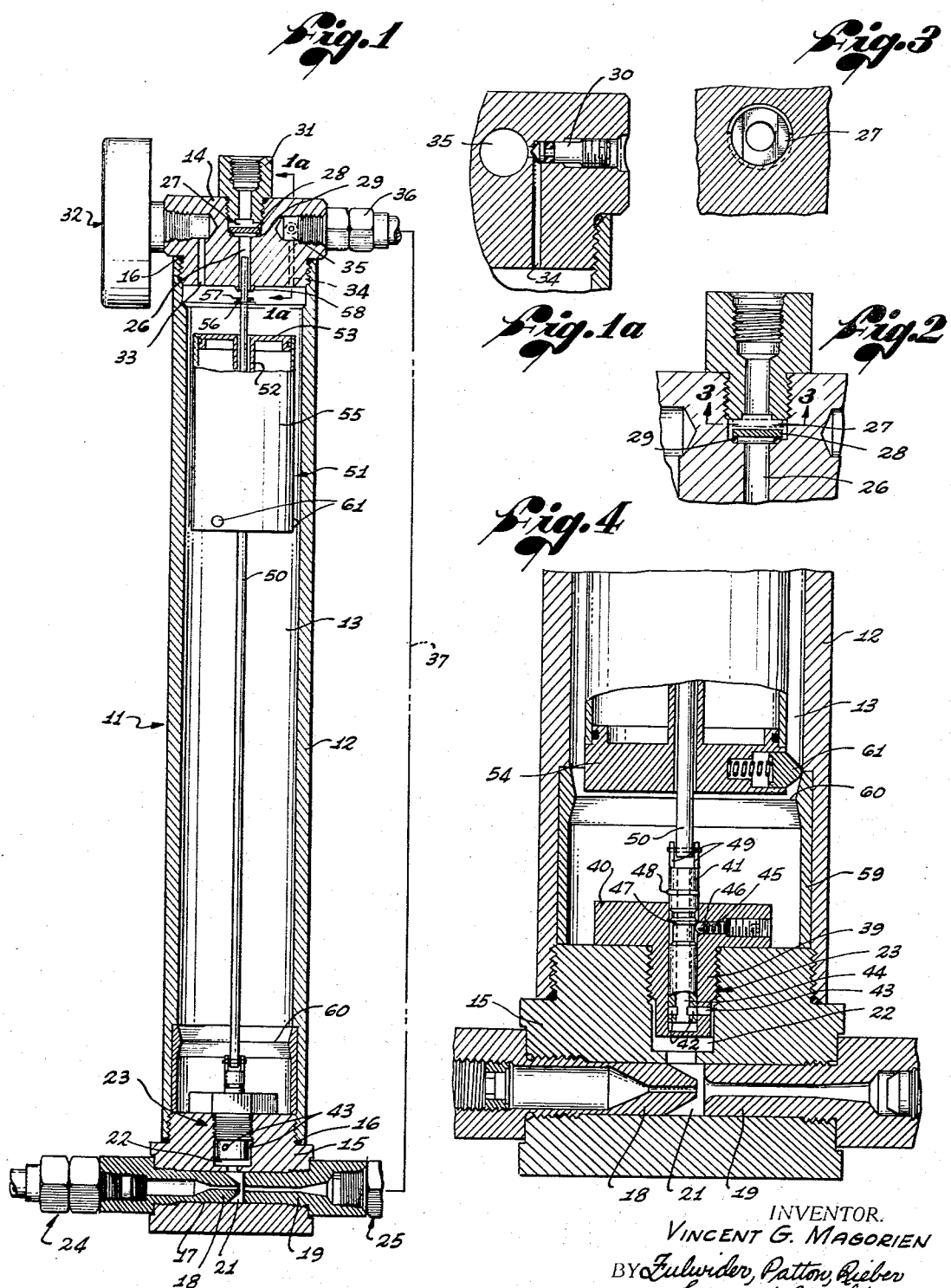

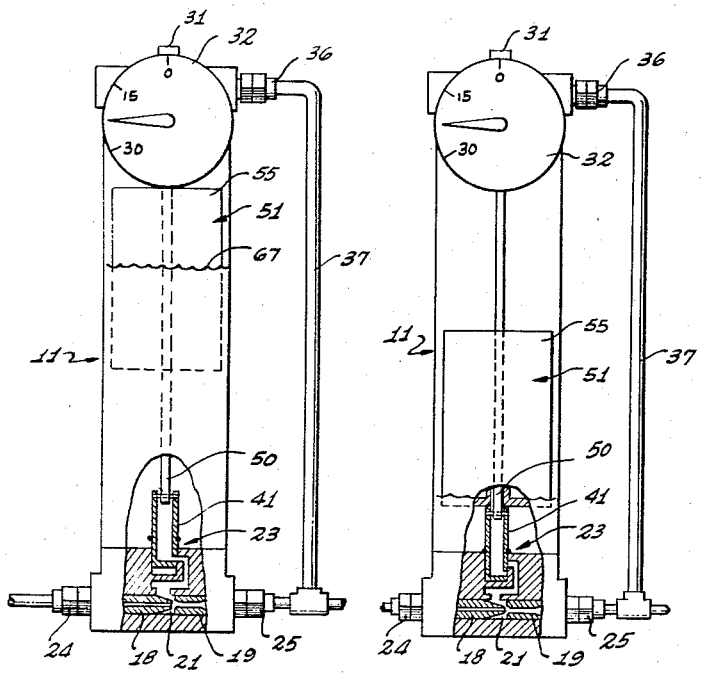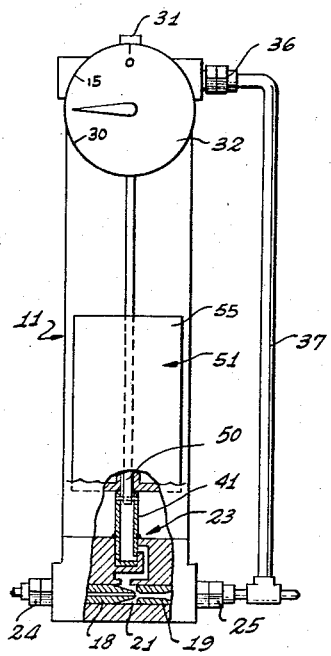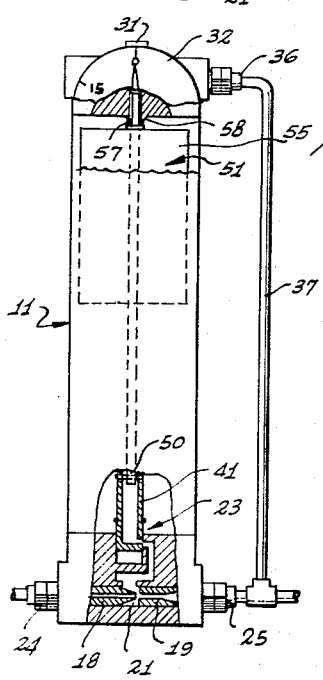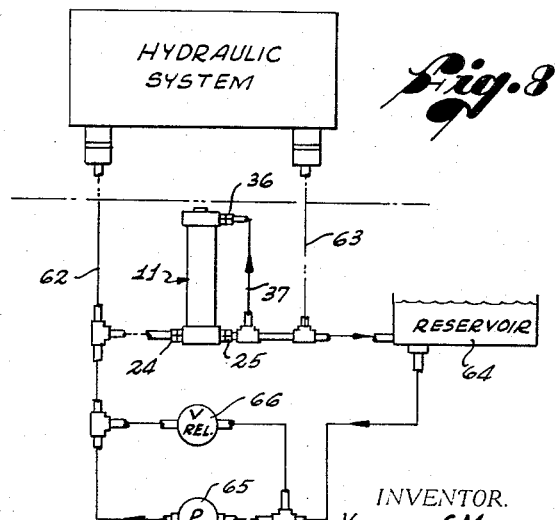

3,358,424
GAS-OIL SEPARATOR
Vincent G. Magorien, Reseda, Calif., assignor to Seaton-Wilson Manufacturing Co., Burbank, Calif., a corporation of California
Filed July 23, 1965, Ser. No. 474,269
5 Claims. (Cl. 55—168)

The present invention relates generally to devices for removing gas from liquids, and more particularly to a separator for removing free, entrained and dissolved air from liquids such as petroleum base oils, chlorinated hydrocarbons and water-glycol solutions.

The separator according to the present invention preferably utilizes a built-in aspirator through which the working liquid is passed to produce a vacuum in a degassing chamber. Return liquid introduced into this chamber is subjected to the low vapor pressure therein, whereupon air and other gases will come out of solution and the degassed liquid is aspirated into the mainstream flow of the working liquid. The air or other gas collected in the degassing chamber is, according to the present invention, periodically and automatically vented from the degassing chamber after a predetermined volume of gas has collected therein.

The present invention finds particular application in hydraulic systems in which free, entrained and dissolved air or other gas may produce detrimental effects on component and system operation. In general, air in a hydraulic circuit causes a lower bulk modulus, rise in fluid temperature from heat of compression, loss of horsepower, instability, cavitation, lower heat transfer rates, and possible electric breakdown of the hydraulic fluid. It therefore becomes important in many hydraulic systems to remove the major part of the air or other gas which may be present therein whether free, entrained or dissolved, and such removal is not only automatically provided for in the separator of the present invention, but this invention also provides for the automatic venting of accumulated removed air when it reaches a predetermined volume in the separation chamber.

While it is obvious that any desired means may be employed to sense the amount of accumulated separated air and effect its automatic venting, a simple arrangement selected for illustration and explanation herein employs a float in the degassing chamber which in its upper, buoyant position opens the degassing chamber to the aspirator and in its lowered, non-buoyant position closes a valve in the passage to the aspirator, whereupon liquid rises in the degassing chamber to force the accumulated separated air therefrom. The position of the float in the degassing chamber is determined by the volume of accumulated separated air therein, and at a predetermined upper position, after venting of a major portion of the air, the float opens the valve to the aspirator and returns the apparatus to its automatic degassing operation.

It is therefore an object of the present invention to provide an improved separator for removing a gas such as air from a liquid such as oil.

Another object of the invention is the provision of an automatic separator for removing a gas from a hydraulic fluid which automatically vents the removed gas from the separator.

A further object of this invention is the provision of an improved gas-liquid separator in which the liquid is subjected to a reduced pressure to induce separation of the gas therefrom and in which the accumulated separated gas is periodically and automatically removed from the separator when it reaches a predetermined volume.

A still further object of this invention is the provision of a gas-liquid separator employing an aspirator through which the fluid is passed to create a lowered pressure in a degassing chamber connected to the aspirator, in which the return fluid is introduced into the degassing chamber and in which a float in the degassing chamber takes alternate upper and lower positions to respectively open and close a communicating passage between the chamber and the aspirator to automatically institute degassing and gas venting cycles.

These and other objects and features of the invention will be readily apparent to those skilled in the art from the following specification and the appended drawing, in which:

FIGURE 1 is a longitudinal sectional view through a gas-liquid separator according to the present invention;

FIGURE 1a is a detail sectional view on the line 1a—1a of FIGURE 1;

FIGURE 2 is an enlarged partial view from the top of FIGURE 1 showing the check valve and its operation;

FIGURE 3 is a detail sectional view on the line 3—3 of FIGURE 2;

FIGURE 4 is an enlarged vertical sectional view through the bottom portion of the separator;

FIGURE 5 is a mainly diagrammatic view showing the separator and float in degassing position;

FIGURE 6 is a view similar to FIGURE 5 but with the separator float in its lowermost position to initiate the automatic dumping of the accumulated gas;

FIGURE 7 is a view similar to FIGURES 5 and 6 but showing the separator float sealing the gas dumping vent; and FIGURE 8 is a schematic representation of one way of connecting the separator according to the present invention in a hydraulic system.

Referring more particularly to FIGURES 1 through 4, the gas-liquid separator 11 according to the present invention is specifically illustrated as comprising an elongated tubular body 12 defining interiorly a cylindrical degassing chamber 13. The ends of the tubular body 12 are closed by an upper end cap 14 and a lower end cap 15 threaded into the respective tube ends and sealed thereto by sealing rings 16.

The lower end cap 15 has a transverse bore 17 therethrough into one end of which is threadedly inserted a nozzle 18 and in the other end of which is threadedly supported a pressure recovering throat element 19. The chamber portion 21 of the bore 17, in which a low pressure is induced by high speed jet flow from nozzle 18, is connected to a chamber 22 in the upper portion of the end cap 15 within which is disposed a shuttle valve 23. A high pressure inlet fitting 24 connects to the nozzle 18 and a low pressure outlet fitting 25 connects to the throat element 19. The nozzle 18 and pressure recovery throat 19 form an aspirator in which high speed fluid flow from the nozzle produces a reduced pressure in the small chamber 21 connected with the nozzle exit. This reduced pressure is communicated through the chamber 22 to the degassing chamber 13.

The upper end cap 14 has a central vent passage 26 therein connected to a chamber 27 formed by a counterbore from the upper face of the end cap 14. Within the chamber 27 is disposed a check valve 28 in the form of a floating disc which in its lower position seals against a ring 29 to close the vent. The counterbore providing the chamber 27 may be opened to the ambient atmosphere or may receive a fitting 31 for conducting away the dumped separated gas. As shown more particularly in FIGURES 2 and 3, the inner end of the fitting 31 (or whatever other stop may be provided for the check valve disc 28) has an end slot or notch which prevents the check valve disc from sealing against the end of the fitting or stop. A low pressure compound gauge 32 is mounted in the end cap 14 and connected by a passage 33 to the chamber 13.

A passage 34 in the end cap 14 provides for the entrance of liquid to be degassed into the degassing chamber 13. The passage 34 connects through an opening restricted by an adjustable, metering needle valve 30 to a bore 35 which receives a tubing fitting 36. In the specific system usage illustrated, a diagrammatically shown tube 37 interconnects the outlet of the throat element 19 with the fitting 36 to provide a direct parastic flow around the throat element through the degassing chamber 13 where any free, entrained or dissolved gas in the liquid is removed. It is obvious that the inlet fitting 36 may be connected to any other point in the hydraulic system from which it is desired to remove the liquid and effect a degassing operation thereon.

The valve 23 comprises a stationary cup-shaped portion 39 threaded into the chamber 22 in the end cap 15 and having an integral cap portion 40 engaging the upper surface of the end cap. Within the cup-shaped portion 39 and through the cap 40 is reciprocally mounted a valve shuttle 41 in the form of a hollow tube. The side wall of the valve shuttle 41 is mill cut at 42 to cooperate with openings 43 through the side wall of the cup-shaped portion 39 to perform the valving operation whereby the chambers 21 and 22 are connected through the interior bore 44 through the valve shuttle 41 with the chamber 13. As shown in FIGURE 4, the valve 23 is in open position with the chamber 22 communicating with chamber 13 through openings 42, 43 and bore 44.

The cap portion 40 is provided with a bore 45 in which is disposed a spring biased indexing ball 46 which cooperates with a land 47 to insure positive action of the valve shuttle 41 into its open and closed positions, the valve shuttle being in open position, as shown, when the ball 46 rests in the groove below the land 47 and in closed position when the ball 46 rests in the groove above the land 47. A snap ring 48 may be provided on the valve shuttle to limit its downward or valve closing position.

A pair of integral arms 49 extend from the upper edge of the valve shuttle 41 and to the arms 49 is pinned a rod 50 which is loosely, slidably received within the vent passage 26. A float 51 surrounds the rod 50 loosely and is movable relative thereto over the major extent of the rod. The float 51 which may be, for example, of a molded plastic or other material and comprises a central tube 52 having integral end caps 53 and 54 thereon to which is sealably secured an outer tubular shell 55 to form an elongated sealed enclosure, annular in cross-section and through the center tube of which extends the rod 50.

About the rod 50 adjacent it upper end is mounted a snap ring 56 adapted to be engaged by the upper end cap 53 of the float to move the rod 50 upwardly. Above the snap ring 56 is a sealing ring 57 cooperating with a valve seat 58 around the vent passage 26 to seal the vent passage under abnormal oil flow conditions, as will be explained hereinafter. The bottom end cap 54 of the float engages the upper edges of the arms 49 to move the valve shuttle 41 in the downward or valve 23 closing direction.

Adjacent the bottom end of the chamber 13 the tubular body 12 is provided with a liner 59 having a double conical portion at its upper end providing a circular ridge 60. The bottom end cap 54 of the float 51 is provided with three spring-biased elements 61 seated therein, which elements cooperate with the ridge 60 to insure positive downward movement of the float in the valve closing direction, thus preventing "hunting" of the valve.

FIGURE 8 illustrates one manner in which the gas-liquid separator according to the present invention may be connected to a hydraulic system to separate air or other gas from the hydraulic fluid. The over-all hydraulic system, which may include a multiplicity of operated components and control valves, is indicated by the labeled block, the system being fed by a high-pressure line 62 and having a return line 63 leading to a reservoir 64 for the hydraulic liquid. The air-liquid separator 11 has its aspirator inlet coupling 24 connected to the high-pressure line 62 and its aspirator outlet coupling 25 connected to the return line 63. In this particular arrangement, the aspirator outlet is connected to the inlet fitting 36 leading to the degassing chamber, but it is understood that the fitting 36 could be connected to any point on the return side of the system, such as directly to the return line 63 at any point therein. The high pressure pump for the system is shown at 65. A by-pass valve 66 may be provided to by-pass the system for starting under no load.

The operation of the gas-liquid separator of the present invention will now be described in connection with the representations of FIGURES 5–7. A position of the float 51 during a normal degassing cycle is shown in FIGURE 5 with the valve 23 open so that the aspirator chamber 21 at the exit of the nozzle 18 is in communication with the degassing chamber 13 and the liquid in the chamber 13 is subjected to a lowered pressure, the vent to the ambient atmosphere being closed by check valve 28.

By way of example only, and without limitation, the high pressure line 62 may be carrying a pressure of the order of 100 p.s.i.–3000 p.s.i. which is applied to the nozzle 18. The return pressure at line 63 and at the outlet of the throat 19 may be of the order of 5 p.s.i.–50 p.s.i. Depending on the size of the nozzle 18 orifice and the flow therethrough, the chamber 21 and the degassing chamber 13 may be lowered to a pressure of, for example, 23 inches of mercury below ambient atmosphere. The liquid from which the air or other gas is to be removed is fed into the top of the degassing chamber 13 through the restricted passage including the metering needle valve 30.

FIGURE 5 indicates an arbitrary level at 67 for the liquid in the degassing chamber 13 during the degassing cycle. As the air or other gas is removed, it accumulates in the upper part of the degassing chamber and forces the level of the liquid therein downwardly, the float 51 moving downwardly therewith. The downward movement of float 51 is arrested momentarily as the spring biased elements 61 thereon engage the upper, inverted conical slope leading to the ridge 60. As the level of the liquid continues to fall, the weight of the float becomes sufficient to force the elements 61 inwardly to move past the ridge 60, whereupon the float descends quickly to engage the arms 49 and move the valve shuttle 41 downwardly to valve 23 closed position shown in FIGURE 6. In this closed position the valve shuttle moved the land 47 past the ball 46 which now seats in the groove thereabove.

With the closing of valve 23, evacuation of the degassing chamber ceases, but the liquid continues to flow into the chamber through the passage 34 and the level of the liquid gradually rises to increase the pressure in the chamber 13 until it slightly exceeds the pressure of the ambient atmosphere, whereupon continued rise of liquid in the degassing chamber forces the accumulated air or gas therein out through the vent passage 26, the check valve 28 opening freely in the venting direction.

As the liquid level rises to vent the air above it from the separator, the float 51 rises therewith but with valve 23 remaining closed, the ball 46 in the groove above land 47 restraining the valve shuttle 41 in its lower position. The float 51 rises without effect until it engages snap ring 56 and its buoyancy overcomes the restraint of ball 46 to snap the valve shuttle 41 into its open position, shown in FIGURES 4 and 5. The chamber 13 is immediately connected to the lowered pressure of the aspirator chamber 21, liquid is sucked from the chamber 13 and a new degassing cycle begun.

The successive operations of degassing and venting of accumulated gas continue automatically so long as high pressure is maintained on the high pressure line 62.

FIGURE 7 shows a safety operation to prevent dumping of hydraulic fluid from the separator. Under abnormal conditions such as no-load starting or plugging of nozzle 18, the aspirator may not produce the lowered pressure and the chamber 13 may fill with liquid back through the throat element 19, as well as through passage 34. As the level of the liquid rises above the point of operation of valve 23, the float 51 continues to rise also until sealing ring 57 engages valve seat 58 to close vent passage 26 and prevent dumping of the hydraulic liquid from the system.

It is therefore seen that the present invention provides a simple, effective, economical and continuously automatic device for removing air or other gas from a liquid, whether free, entrained or dissolved. When used in a hydraulic system, it will remove air or other gas therefrom to maintain the system hard or stiff and insure proper operation of the components thereof and the avoidance of the ill effects which accompany the presence of the air in any form in the closed system.

The operation is entirely automatic and continuous in successive degassing and gas venting cycles performed without manual intervention, the separator functioning in such automatic and continuous manner so long as pressure is maintained on the high pressure line of the system in which it is connected.

While certain preferred embodiments of the invention have been specifically illustrated and described, it is understood that the invention is not limited thereto as many variations will be apparent to those skilled in the art, for example, the float can control the valving electrically as well as mechanically, and the invention is to be given its broadest interpretation within the terms of the following claims.

I claim:

1. A separator for removing gas from a liquid comprising: means providing a degassing chamber; means providing a liquid inlet and a liquid outlet for said chamber; means for subjecting said chamber to a reduced pressure through said liquid outlet; a gas vent adjacent the top of said chamber; an automatic check valve for said gas vent opening outwardly only; a valve for said liquid outlet; an operating rod connected to said valve and extending vertically through said chamber; a float in said chamber and surrounding said rod for loose, sliding motion thereon; upper and lower abutments engaged by said float in upper and lower positions for moving said valve respectively to open and closed positions; and resilient means for impeding the lowermost movement of the float until the float weight increases to a value to overcome the impeding means and thereafter move downwardly substantially unimpeded to effect positive quick closing of the outlet valve.

2. The separator defined in claim 1 in which said impeding means comprises elements carried by the float and spring biased to engage the vertical walls defining said chamber, said chamber vertical walls including an obstruction projecting inwardly thereof past which the spring-biased members must move as the float moves to its lowermost position.

3. A separator for removing gas from a liquid comprising: means providing a degassing chamber; means providing a liquid inlet and a liquid outlet for said chamber; means for subjecting said chamber to a reduced pressure through said liquid outlet; a gas vent adjacent the top of said chamber; an automatic check valve for said gas vent opening outwardly only; a valve for said liquid outlet; an operating rod connected to said valve and extending vertically through said chamber; a float in said chamber and surrounding said rod for loose, sliding motion thereon; upper and lower abutments engaged by said float in upper and lower positions for moving said valve respectively to open and closed position; and spring-biased indexing means for resilient holding the outlet valve in its fully closed and fully opened position, said indexing means being overcome by the force exerted by the float to snap the outlet valve past the indexing means from one position to the other to insure positive action thereof.

4. The separator defined in claim 3 in which said spring-biased indexing means comprises a land disposed in a horizontal plane on said valve, and a spring-biased ball engaging at opposite sides of said land in the open and closed positions of the valve.

5. A separator for removing gas from a liquid comprising: means providing a degassing chamber; means providing a liquid inlet and a liquid outlet for said chamber; means for subjecting said chamber to a reduced pressure through said liquid outlet; a gas vent adjacent the top of said chamber; an automatic check valve for said gas vent opening outwardly only; a valve for said liquid outlet; an operating rod connected to said valve and extending vertically through said chamber; a float in said chamber and surrounding said rod for loose, sliding motion thereon; upper and lower abutments engaged by said float in upper and lower positions for moving said valve respectively to open and closed positions; resilient means for impeding the lowermost movement of the float until the float weight increases to a value to overcome the impeding means and thereafter move downwardly substantially unimpeded to effect positive quick closing of the outlet valve; and spring-biased indexing means for resilient holding the outlet valve in its fully closed and fully opened positions, said indexing means being overcome by the force exerted by the float to snap the outlet valve past the indexing means from one position to the other.

References Cited
UNITED STATES PATENTS

| | | | |
|---|---|---|---|
| 1,255,018 | 1/1918 | Jones | 55—170 |
| 1,490,462 | 4/1924 | Gill | 55—168 |
| 1,521,386 | 12/1924 | Neill | 55—168 |
| 1,674,699 | 6/1928 | Overstrom | 55—168 |
| 2,428,045 | 9/1947 | Sharp et al. | 55—194 X |
| 2,869,673 | 1/1959 | Erwin | 55—168 X |
| 2,995,201 | 8/1961 | Stafford et al. | 55—160 |
| 3,112,190 | 11/1963 | Topol | 55—169 X |

SAMIH N. ZAHARNA, *Primary Examiner.*

REUBEN FRIEDMAN, *Examiner.*

J. ADEE, *Assistant Examiner.*